US009607055B2

(12) United States Patent
Imler et al.

(10) Patent No.: US 9,607,055 B2
(45) Date of Patent: Mar. 28, 2017

(54) SYSTEM AND METHOD FOR DYNAMICALLY RETRIEVING DATA SPECIFIC TO A REGION OF A LAYER

(71) Applicant: Yahoo! Inc., Sunnyvale, CA (US)

(72) Inventors: Sean Michael Imler, San Jose, CA (US); Kevin Cheng, San Francisco, CA (US)

(73) Assignee: Excalibur IP, LLC, Sunnyvale, CA (US)

( * ) Notice: Subject to any disclaimer, the term of this patent is extended or adjusted under 35 U.S.C. 154(b) by 0 days.

(21) Appl. No.: 14/993,081

(22) Filed: Jan. 11, 2016

(65) Prior Publication Data

US 2016/0125051 A1   May 5, 2016

Related U.S. Application Data

(63) Continuation of application No. 14/188,418, filed on Feb. 24, 2014, now Pat. No. 9,235,597, which is a continuation of application No. 14/021,809, filed on Sep. 9, 2013, now Pat. No. 8,688,670, which is a continuation of application No. 11/590,943, filed on Nov. 1, 2006, now Pat. No. 8,533,217.

(51) Int. Cl.
*G06F 17/30* (2006.01)
*G06F 3/0484* (2013.01)

(52) U.S. Cl.
CPC .... *G06F 17/30554* (2013.01); *G06F 3/04842* (2013.01); *G06F 17/30061* (2013.01); *G06F 17/3087* (2013.01); *G06F 17/30241* (2013.01)

(58) Field of Classification Search
CPC ...................... G06F 17/30241; G06F 17/3087
USPC ........................................ 707/705, 769, 722
See application file for complete search history.

(56) References Cited

U.S. PATENT DOCUMENTS

2006/0271281 A1* 11/2006 Ahn ..................... G09B 29/106
701/532

* cited by examiner

*Primary Examiner* — Thu-Nguyet Le
(74) *Attorney, Agent, or Firm* — Brinks Gilson & Lione (57) ABSTRACT

A system may provide for retrieving data within a selected region of a map is provided. The system may include mobile devices configured to display a map and to receive a user selection of a region of the map. An application server may receive data from the mobile device, representing the user selected region of the map and a search criterion. A database may be in operative communication with the application server and executes a query using the data representing the selected region of the map and the search criterion and to return data results corresponding to a plurality of locations within the selected region and related to the search criterion. The mobile device may further be configured to display the data results corresponding to the plurality of locations on the selected region of the map and the displayed data results are automatically updated when the user moves the selected region of the map.

20 Claims, 8 Drawing Sheets

SYSTEM AND METHOD FOR DYNAMICALLY RETRIEVING DATA SPECIFIC TO A REGION OF A LAYER

CROSS-REFERENCE TO RELATED APPLICATIONS

The present application is a continuation of U.S. patent application Ser. No. 14/188,418, filed Feb. 24, 2014, now U.S. Pat. No. 9,235,597, which is a continuation of U.S. patent application Ser. No. 14/021,809, filed Sep. 9, 2013, now U.S. Pat. No. 8,688,670 issued on Apr. 1, 2014, which is a continuation of U.S. patent application Ser. No. 11/590,943, filed Nov. 1, 2006, now U.S. Pat. No. 8,533,217 issued on Sep. 10, 2013, all of which are incorporated by reference herein.

TECHNICAL FIELD

The present embodiments relate generally to dynamically retrieving data, and more particularly, but not exclusively, to dynamically retrieving data specific to a region of a layer or a map.

BACKGROUND

Mapping services have become an integral part of web users' online experience. The use of mapping services is on the rise. As more users turn to online mapping services for information, the lines between location searching and information searching may blur. Instead of searching the global internet for information, a user may search for information specific to a geographic region they define. Furthermore, advertisers may have the ability to target the user with ads specific to the user defined geographic region.

Online mapping services may provide a venue for web providers and advertisers to efficiently target users. The efficiency of the user's search and of the advertiser's targeted advertising may be inherently tied to the user's ability to define a geographic region to search. Therefore there may be value in giving the user the ability to precisely define a specific geographic search region.

Currently the YAHOO! LOCAL MAPS service may allow the user to search near an address or within an entire viewable area, giving the user little control over the region they are searching. The breadth of the geographic search is left completely to the discretion of the YAHOO! LOCAL MAPS service, which may result in useless search results and irrelevant advertisements. For example, a user may wish to search an on-line map for coffee shops near the north end of the Golden Gate Bridge. To do so the user may have to know the address of a location near the north end of the Golden Gate Bridge and then search for coffee shops near the address. The YAHOO! LOCAL MAPS service may return coffee shops within a certain distance north and south of the Golden Gate Bridge. The user may have no interest in the coffee shops south of the Golden Gate Bridge, but the user's inability to define a specific search region may leave them at the mercy of the YAHOO! LOCAL MAPS service's discretion. Furthermore, the YAHOO! LOCAL MAPS service may have complete control over the breadth of the geographic search. The user may only be interested in coffee shops within a certain distance north of the north end of the Golden Gate Bridge. With the YAHOO! LOCAL MAPS service, a user may be presented with useless information and irrelevant advertisements while useful information and relevant advertisements may fail to be displayed.

SUMMARY

In accordance with the systems, products, and methods described herein, a system for retrieving data within a selected region of a map is provided. The system includes mobile devices configured to display a map and to receive a user selection of a region of the map. An application server receives data from the mobile device, representing the user selected region of the map and a search criterion. A database is in operative communication with the application server and executes a query using the data representing the selected region of the map and the search criterion and to return data results corresponding to a plurality of locations within the selected region and related to the search criterion. The mobile device is further configured to display the data results corresponding to the plurality of locations on the selected region of the map and the displayed data results are automatically updated when the user moves the selected region of the map.

Additional systems and methods described herein provide a non-transitory computer readable storage medium having stored therein data representing instructions executable by a programmed processor for retrieving data within a user selected region of a map. The computer readable medium contains instructions for receiving a first request for data corresponding to a user selected region of a map and a search criterion, and identifying data results corresponding to a plurality of business locations within the user selected region of the map and corresponding to the search criterion. The data results are displayed on a map of a mobile device, and automatically updated when the user selected region of the map changes.

Additional systems and methods provide for a computer-implemented method using a processor for retrieving data specific to a user selected region of a map. The method includes receiving a user selection of a geographic region of a map displayed on a mobile device and a search criterion and determining data results representing a plurality of business locations within the geographic region of the map that correspond to the search criterion. The data results are displayed on the map displayed on the mobile device and automatically refreshed when the user changes the selected geographic region of the map.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

DETAILED DESCRIPTION

A system, tool and method, generally referred to as a tool, relate to dynamically receiving information specific to a region, and more particularly, but not exclusively, to dynamically receiving information specific to a region selected from a layer and/or a map. The principles described herein may be embodied in many different forms. The tool may allow map applications to display specific geographically relevant information pertaining to a region the user selected. The tool may allow businesses to target users with geographically relevant advertisements and media based on the user selected region. The tool and methods may allow for the selection of a region and the retrieval of data in any application that graphically represents data. This may also include an application that visually depicts a sound file. Further, the tool may allow a user to select a region and then quickly find information specific to the region they selected. The tool may be more efficient to use than known systems.

Figure 1:
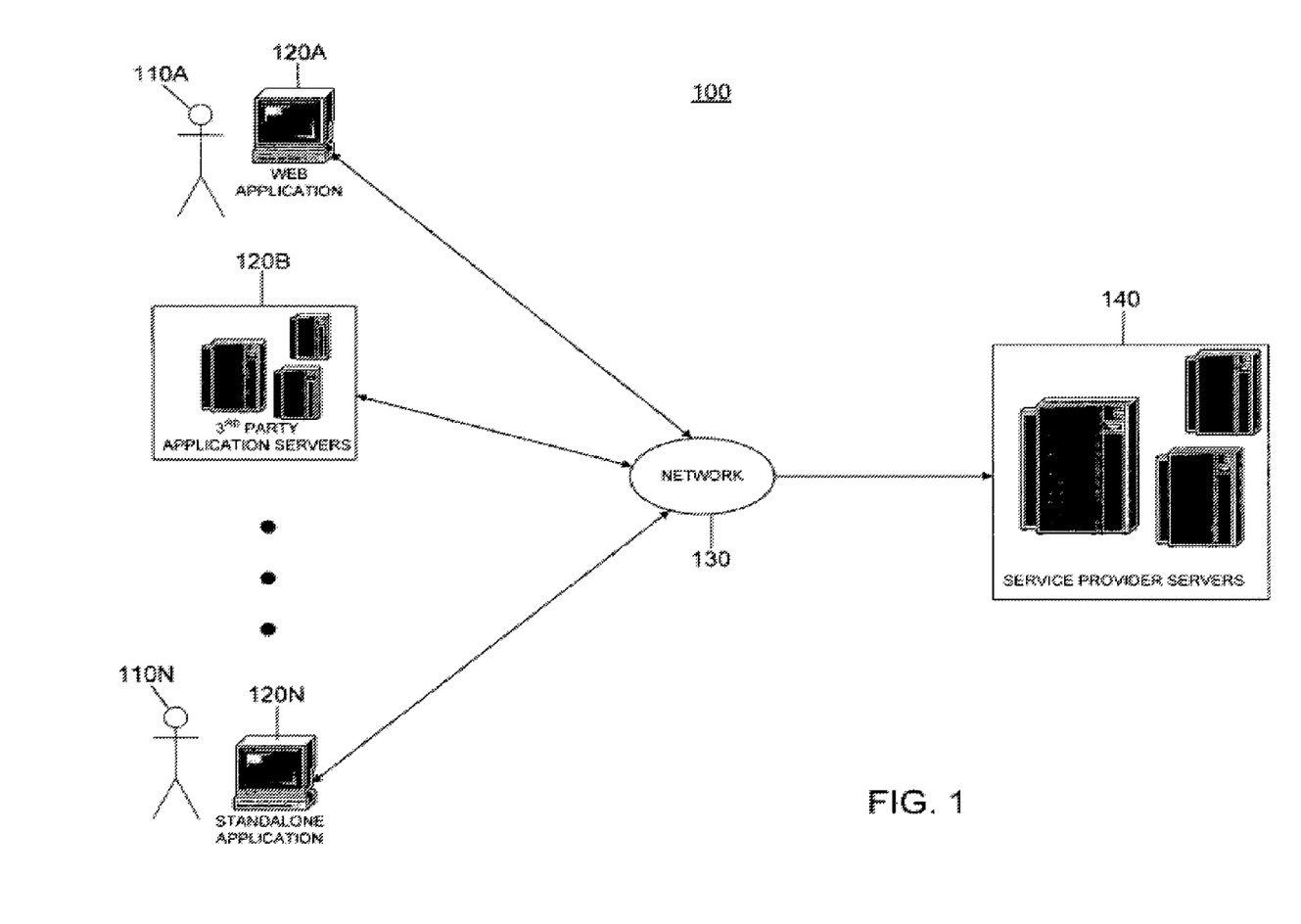
FIG. 1 provides a simplified view of a network environment implementing a selector tool.

FIG. 1 shows a general overview of a system 100 that may implement a tool for dynamically retrieving information based on a user selected region. The system 100 may include one or more web applications, third party application servers or standalone applications 120A-N, users 110A-N, a network 130 and service provider servers 140, such as YAHOO! Mapping service servers. In the system 100, web applications, third party application servers and standalone applications 120A-N, may connect to the service provider servers 140 through the network 130.

The web application 120A may run on any platform that supports web content, and may include a web browser. This may include a computer, a mobile phone, or any appliance capable of data communications, including, but not limited to, any appliance supporting the ADOBE FLASH PLAYER or other machine, whether virtual or not, used to run or parse files, such as FLASH files or other files used, such as to create animations, advertisements, various web page components, integrate video into web pages and develop rich internet applications such as portals.

The standalone applications 120N may be programmed in any programming language that supports communication protocols. These languages may include: SUN JAVA, C++, C#, ASP, SUN JAVASCRIPT, asynchronous SUN JAVASCRIPT, or ADOBE FLASH ACTIONSCRIPT, amongst others. The third party application servers 120B may be running any standard application server software. Such software may include: APACHE TOMCAT, MICROSOFT IIS, ADOBE COLDFUSION, or yapache amongst others. The standalone applications 120N may be third party standalone applications.

The web browsers, third party application servers and standalone applications 120A-N may be connected to the network 130 in any configuration that supports data transfer. This may include a data connection to the network 130 that may be wired or wireless. The web browsers, third party application servers and standalone applications 120A-N may individually be referred to as a client application, or an application.

The service provider servers 140 may include one or more of the following: an application server, a data source, such as a database server, and a middleware server. The service provider servers 140 may co-exist on one machine or may be running in a distributed configuration on one or more machines. The service provider servers 140 may collectively be referred to as the server.

There may be several configurations of database servers, application servers and middleware servers that may support such a system. Database servers may include MICROSOFT SQL SERVER, ORACLE, IBM DB2 or any other database software, relational or otherwise. The application server may be APACHE TOMCAT, MICROSOFT IIS, ADOBE COLDFUSION, yapache or any other application server that supports communication protocols. The middleware server may be any middleware that connects software components or applications.

The database may include fields that link the data entry to the underlying layer the user may be selecting from. In a mapping application utilizing a circular selector tool this may entail: including a longitude and latitude value with each database entry and a distance indicating the radial proximity to the longitude and latitude that the entry relates to, including a range of longitude and latitude values that describe a geographic area where the entry pertains to, or including a physical location address and a radial distance from the address identifying an area which the entry pertains to. There may be several other methods of linking a data entry to the data represented on a layer, all of which may function properly within the present system. In the case of a visual depiction of a sound file, information may be linked to specific times in the sound file. The information may be any data or file, such as a document, image or media, such as photos, videos, businesses and transit information.

Alternatively, the system 100 may exist internally within one machine. In this implementation a standalone application 120N may be running on the machine and the service provider servers 140 may be a data source on the machine. The network 130 may represent the channel in which the standalone application 120N retrieves data from the data source.

Alternatively, the service provider servers 140 may request data relevant to a region selected within a web application 120A or a third party standalone application 120N from a third party application server 120B. Upon receiving the requested data from the third party application server 120B, the service provider servers 140 may then communicate the data to the web application 120A or third party standalone application 120N. The web application 120A or the third party standalone application 120N may then display the data retrieved from the third party application server 120N to the user.

For instance, a user 110A may request information regarding current events relevant to a selected geographic region on a web application 120A. The current events data may not reside on the service provider servers 140, but may reside on an open third party application server 120B, such as a newspaper's open application server. The service provider servers 140 may retrieve the current event data relevant to the selected region from the newspaper's open application server and may then communicate the retrieved data to the web application 120A.

Figure 2:
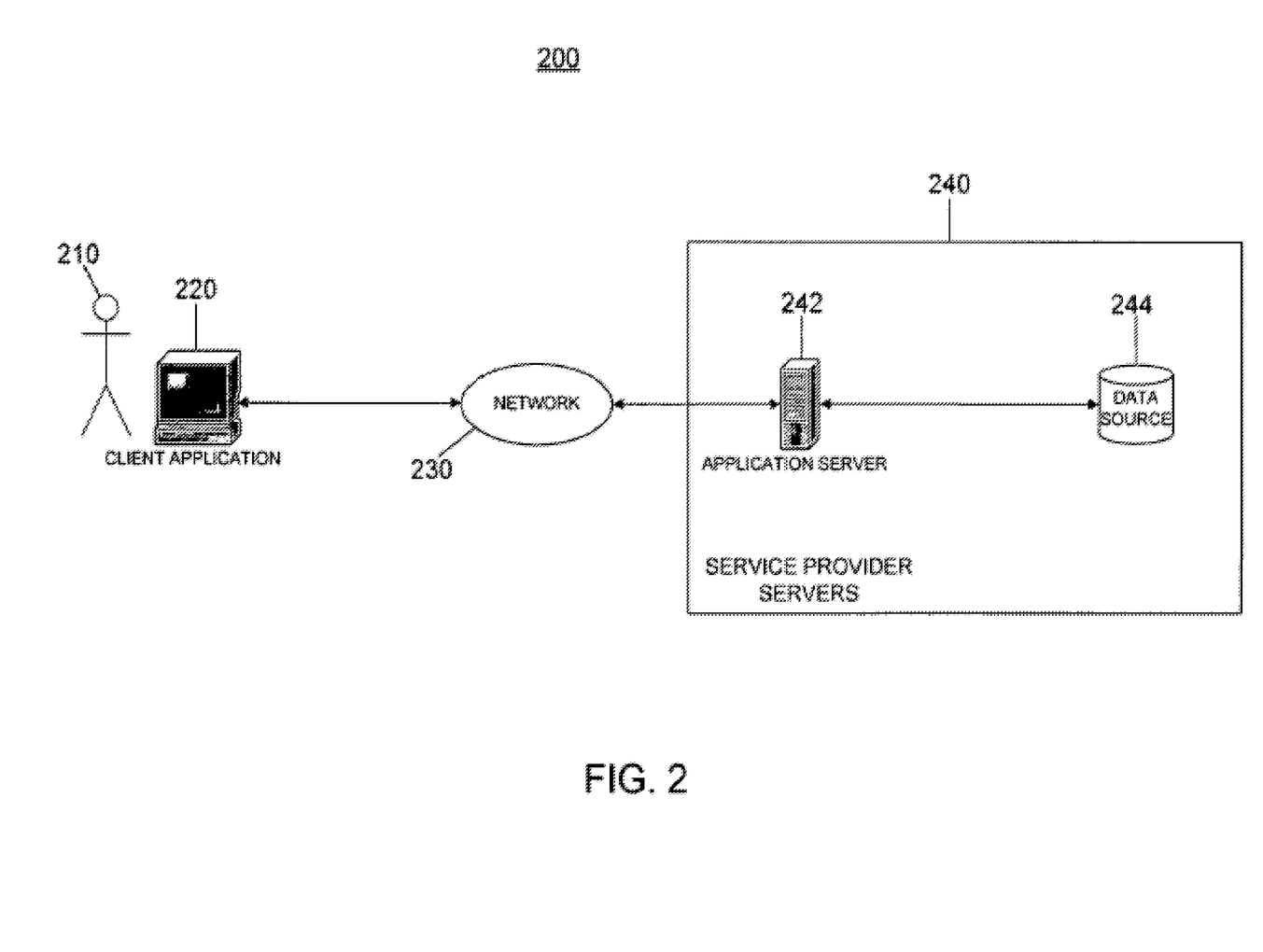
FIG. 2 is a diagram illustrating an exemplary selector tool.

FIG. 2 shows a system 200, one implementation of the system 100 described in FIG. 1, implementing a method for dynamically retrieving geographically relevant data based on a user selected region. The system 200 may include one or more of a client application 220, a network 230, and service provider servers 240 which may include one or more of an application server 242, and a data source 244. The client application 220 may connect to the service provider servers 240 via the network 230. The client application 220 may interact with the service provider servers 240 through the application server 242. The client application 220 may communicate to the data source 244 via the application server 242 or the client application 220 may communicate with the data source 244 directly. The service provider servers 240 may be only one server running the application server 242 and storing the data source 244.

The client application 220 may be any of the web browser 120A, third party application servers 120B or a standalone application 120N. The client application 220 may be running on a machine that has a processor, memory, a display, and an interface. The processor may be operatively connected to the memory, display and the interface and may perform tasks at the request of the client application 220 or the underlying operating system, such as determining the data points within the user selected region, communicating a query to the data source 244 and receiving data from the data source 244. The display may be operatively connected to the memory and the processor and may be capable of displaying information to the user 210, such as the layer the user 210 is selecting from and the data received from the data source. The interface may be operatively connected to the memory, the processor, and the display, and may be manipulated by the user 210 to select a region from a layer, such as a map.

If the client application 220 is the web browser 120A, the web browser 120A may be running the ADOBE FLASH PLAYER or other machine, whether virtual or not, used to run or parse files, such as FLASH files or other files used, such as to create animations, advertisements, various web page components, integrate video into web pages and develop rich internet applications such as portals. ADOBE FLASH, for example, interacts with the application server 242 in an asynchronous mode, enabling rapid local interactivity and display without having to wait for responses from the application server 242.

Asynchronous describes the way in which communications between the client application 220 and the application server 242 may be handled. The client application 220 may send a request to the application server 242 and then may continue to function without waiting for the response from the application server 242. When the response arrives from the application server 242 the client application's 220 event handler processes the response and passes on the relevant information to the user 210. Several other thin client implementations, such as asynchronous SUN JAVASCRIPT, may also function properly in lieu of ADOBE FLASH PLAYER.

The client application 220 may communicate with the application server 242 using messages such as XML messages or any data format. In this way, the tool may send information via the client application's 220 communication protocol regarding an area that the user 210 wishes to search. XML messages may include the following information: the URL of the service provider servers 240, a data representation of the user selected area, and a search criterion. The data representation may include the location, the boundary and the size of the selector tool. In the case of a circular user selected region, the data representation may include the latitude and longitude of the center point of the circular selected region, and the radius of the circular selector tool. The data representation may also be the set of data points on the layer encompassed by the user selected region.

If the client application 220 communicates to the application server 242 using an XML message, the application server 242 may parse the XML message and query the data source 244 with a query generated from the XML message. The data source 244 may return the resulting dataset to the application server 242. If the application server 242 uses XML messages to communicate to the client application 220, the application server 242 may format the resulting dataset into an XML message and transmit the XML message to the client application 220. If the client application 220 receives XML messages from the application server 242, the client application 220 may parse the XML message and display the results to the user 210 through an interface, such as a graphical user interface.

Figure 3:
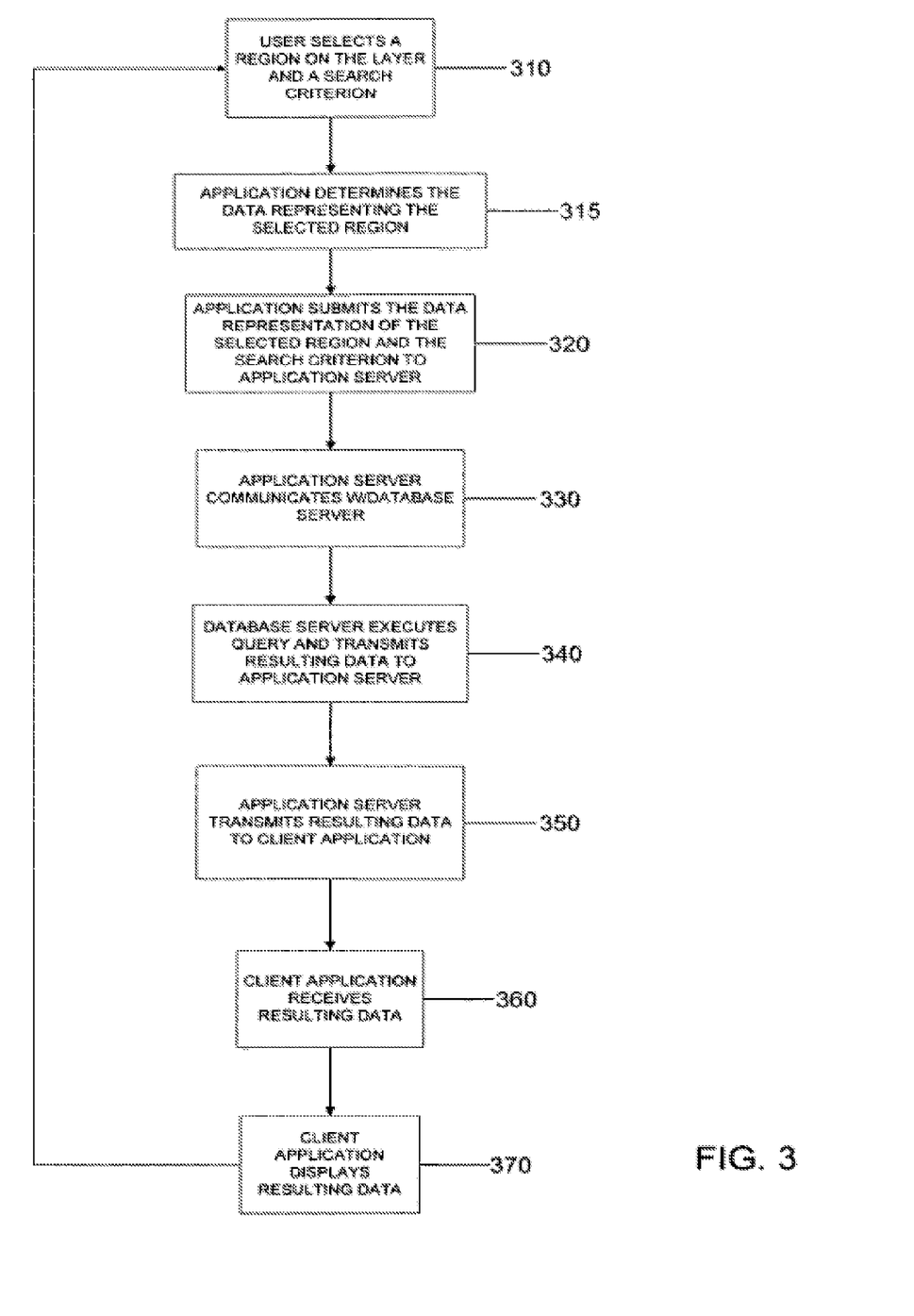
FIG. 3 is a flowchart illustrating the operations of a system implementing a selector tool when a user uses the tool to specify a region.

FIG. 3 illustrates a flowchart that demonstrates a basic progression of the system 200 represented in FIG. 2. The flowchart gives an overview of the steps that may occur when a user 210 selects a region on the layer and inputs a search criterion. For explanation purposes, the steps may be with reference to a circular selector tool, but other shaped selection tools may be used such as known or other defined shapes.

At block 310 the user 210 selects a region on the layer and inputs a search criterion. In a mapping application this step may include using a selector tool to select the desired region of the map and inputting a search criterion. Determining the region may include moving the map, moving the selector tool, resizing the selector tool, or zooming into or out of the map. The selector tool may exist independent from the surface, such as a map, that it is sitting on. The selector tool may be persistent, that is the boundary of the tool may remain visible after determining, moving, or resizing the tool. The user 210 may select the search criterion from a preset list of categories presented to the user 210, or the user 210 may manually enter a search term in lieu of a preset category. The criterion may facilitate the user 210 in receiving a focused set of relevant data. In the alternative, the tool may not require that the user 210 input a search criterion and may simply retrieve information based on the selected region.

Once the user 210 determines the region of the layer, the system 200 continues to block 315. The user 210 may continue operation of the selector tool while the system continues on to blocks 315 through 370. At block 315, the client application 220 may determine a data representation of the selected region. The data representation may include the location, the boundary and the size of the selector tool. For a circular selector tool in a mapping application the selected region may be represented by the longitude and latitude of the center point, and the radius, of the selected region. Furthermore, the radius of the selected region may be measured in the scale of the underlying map, not the scale of the display. In the case of a mapping application the user 210 may be able to zoom into and out of the map and the selector tool may remain the same size on the display. However, the value of the radius of the selected region may change to reflect the change in scale of the underlying map, and consequently the change in scale of the selected region.

At block 320 the client application 220 may submit the data representation of the selected region, and the search criterion to the application server 242. The data representation may include the location, the boundary and the size of the selector tool. In the case of a circular selector tool the data representation may include the longitude and latitude of the center point and the radius of the selected region. This communication may be in the form of an XML message or may include submitting a URL with the longitude, latitude, radius and search criterion as parameters of the URL query string. If a selector tool of a different shape is being used, other and/or additional information may be used to describe the shape.

The user 210 may have the option of indicating the maximum number of results returned or the option of automatically resizing the selected region if no results are found. If the user 210 opts to limit the number of results returned, the results in closest proximity to the center point of the selected region may be returned first. If the user 210 opts to automatically resize the selected region, the system may automatically resize the selected region to a size that includes at least one search result if no search results are initially found.

At block 330 the application server 242 may query the data source 244 utilizing the parameters passed to the server from the client application 220. If the client application 220 communicated to the application server 242 via an XML, message the application server 242 may need to parse the XML message to extract the parameters before submitting the query to the data source 244. The query may be built dynamically from the parameters submitted by the client application 220. Alternatively the parameters may be submitted as part of a stored procedure to the data source 244. The application server 242 may also query the data source 244 for advertising data relevant to the selected geographic region.

At block 340 the data source 244 may execute the query and transmit the resulting data set to the application server 242. At block 350 the application server 242 transmits the resulting data set to the client application 220, such as the web browser 120A. The data may be transmitted unaltered or may be formatted into XML, or any other data format or data object. At block 360 the client application 220 receives the data or data objects from the application server 242. If the data is formatted in XML the client application 220 may parse the data. Any XML parser, such as the APACHE XERCES may be used for XML parsing. Alternatively the client application 220 may communicate directly with the data source 244.

At block 370 the client application 220 displays, such as via the web browser 120A or via a monitor, the data received from the application server 242, in a format appropriate for the underlying data layer. Where the data layer is a mapping application, the client application 220 may display the data as a visual depiction on a map, such as points on a map, or as a list next to the map, such as ordered by the distance from the center of the selected region. Furthermore, the points on the map may be displayed as flags or numbers corresponding to a numbered search result list. The numbered search result list may be displayed on or near the map. Alternatively, the application server 242 may return data that is relevant to a range outside of the selected region. The range outside of the selected region may be defined by a default value or may be specified by the user. In a mapping application, the data that is relevant to a range outside of the selected region may be displayed distinct from the data relevant to the specified region, such as different colored flags for data that falls outside of the selected region.

The displayed data may contain URL links to the homepage of the individual data items so that the user 210 may connect to and view information on the home page. An advertiser may be charged every time a user 210 clicks through or views the link. The data may also be displayed in other ways, such as alphabetically with a phone number and address relating to the data item. If the returned data includes advertising data, the advertising data may be displayed as points on the map, links in the list of results, and/or banner ads. Furthermore, the points on the map may be displayed as flags or numbers corresponding to a numbered search result list. The numbered search result list may be displayed on or near the map. The advertising data may be ordered based on its relevance to the region or the search criterion, the price paid by the advertiser, or any other metric or combination of metrics. Alternatively, the client application 220 may display the requested data and any advertising data in any format or mode that conforms to the underlying data layer.

Figure 4:
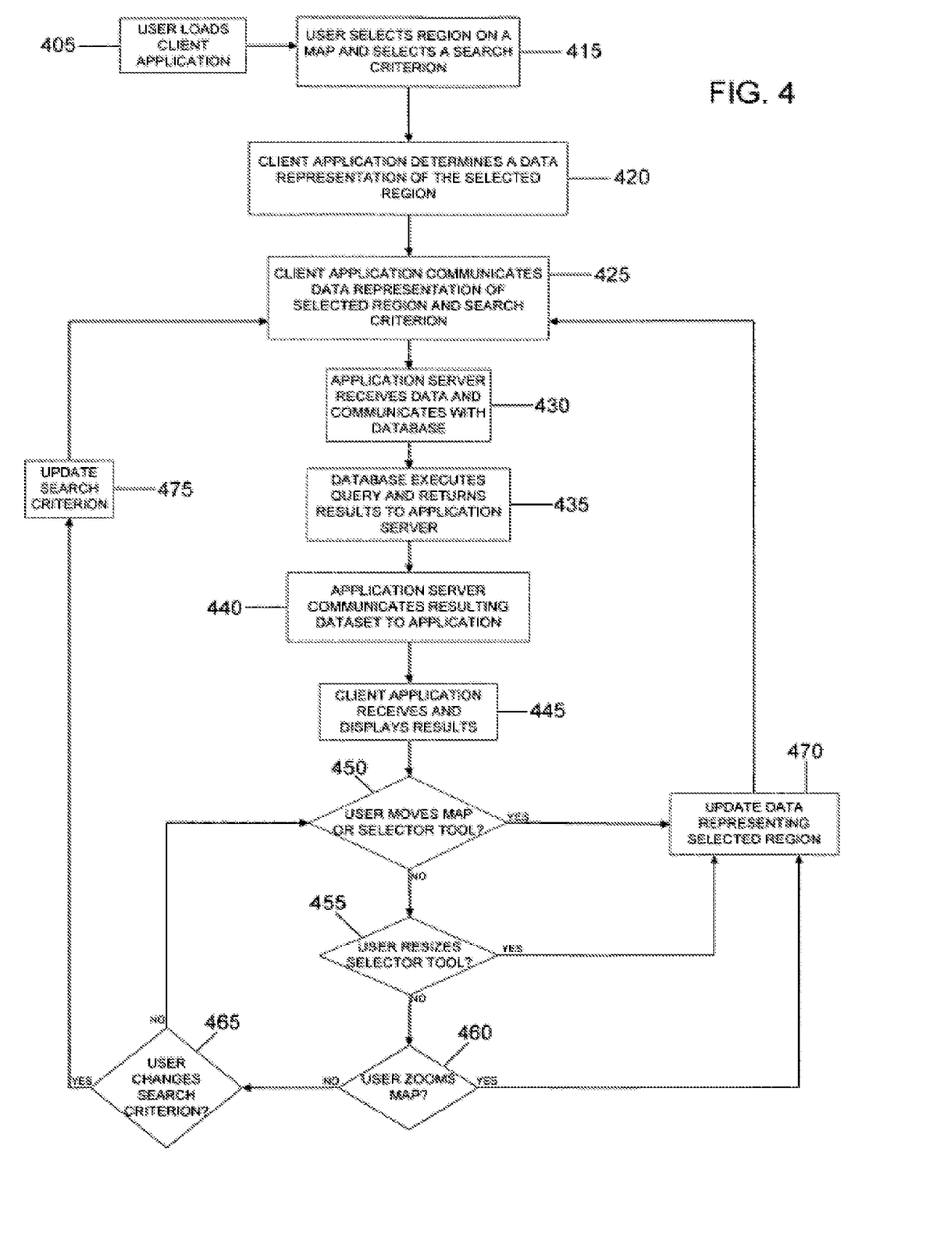
FIG. 4 is a flowchart illustrating the operations of a system implementing a selector tool.

FIG. 4 shows a flowchart of an example of exemplary functionality of the system 200 and the interaction between the client application 220 and the service provider servers 240. At block 405, the user 210 loads the client application 220. The user 210 may load the client application 220 by inputting the URL of the client application 220 into their web browser 120A, such as the URL of a mapping application or the URL of an application that utilizes a mapping application. This step may include a third party application server 120B submitting a request to the service provider servers 240. This step may also include the client application 220 displaying data to the user, such as a map in a mapping application. Alternatively the user may launch a standalone application 120N, which may interact with the service provider servers 240. The standalone application 120N may be an embedded application running in a device such as a GPS device or a mobile phone or any application running on a platform that supports the ADOBE FLASH PLAYER, SUN JAVASCRIPT, or any programming language implementing communication protocols.

At block 415 the user 210 may use the selector tool to select a region on the map and may select a search criterion. The user 210 may use an input device, such as a keyboard, a mouse, a touch pad, a touch screen display, a light pen, or a remote control, to manipulate the selector tool to encompass the desired region. The user 210 may have the ability to resize the area of the region encompassed by the selector tool, such as by dragging the boundary of the selector tool. There may be several alternative methods for identifying the selected region. The user 210 may use a polygonal selector tool to select a polygonal area or a line selector tool to identify a line or path. There may be an interface that allows the user 210 to enter an address. Furthermore, the user 210 may be able to specify a range from the address, origin, center, or line, to select a search area.

The user 210 may select the search criterion from a preset list of categories presented to the user 210, or the user 210 may manually enter a search criterion in lieu of a preset category. In either case, the criterion or category may facilitate the user 210 in receiving a focused set of relevant data. Alternatively or additionally, the system 200 may not require that the user 210 input a search criterion and may simply retrieve information based on the selected region.

At block 420 the system 200 may determine a data representation of the selected region. The data representation may include the location, the boundary and the size of the selector tool. If the user 210 had employed a circular selector tool, the coordinates of the center point of the selected region and the radius of the selected region may be determined. If the user 210 had employed a polygonal selector tool the coordinates of the corners of the polygonal area may be determined. In an implementation that visually depicts a sound file the time values of the selected range may be used to represent the selected region.

At block 425 the client application 220 communicates the data representing the selected region and the search criterion to the application server 242. In the case of a circular selector tool the data representing the selected region may include the longitude and latitude of the center point and the radius of the selected region. This data may be transmitted to the application server 242, such as through an XML, message or through a URL with the data as parameters in the URL query string. Alternatively, the data representing the selected region may include several longitude/latitude pairs or other identifying values. Alternatively the data may include other values necessary in identifying the selected region.

At block 430 the application server 242 may receive the data from the client application 220 and may parse the data if the data was formatted in XML. Using the values extracted from the message, the application server 242 may generate a query and search the data source 244. Alternatively the application server 242 may utilize a stored procedure or other data retrieval method to perform the database search. The form of the query may be dependent on the manner in which the data is stored in the data source 244.

The application server 242 may also query the data source 244 for advertising data relevant to the selected region. The advertising data may include advertisements from advertisers relevant to the selected region. The advertising data may also be linked to the user's 210 search criterion.

Alternatively, advertisers may use the selector tool to select a region their advertisements relate to. In this case the advertisers may select a region that may be used to store data related to the advertiser's advertisements. The advertiser may use the selector tool to select a region and select advertisements to associate or link to the advertiser selected region. Data representing the advertiser selected region and the advertiser linked ad data may then be transmitted to the application server 242 and stored in the data source 244. The advertisement data may be retrieved and displayed to the user 210 if the region selected by the user 210 intersects with an advertisement region previously selected by an advertiser.

At block 435 the data source 244 executes the query and returns the data results to the application server 242. If the data is to be formatted in XML or some other data format, either the data source 244 or the application server 242 may format the data. At block 440 the application server 242 communicates the data to the client application 220.

At block 445 the client application 220 receives the data from the application server 242 and displays the results in a manner consistent with the underlying layer. In a mapping application the data may be displayed as points on the map, or as an ordered list. Furthermore, the points on the map may be displayed as flags or numbers corresponding to a numbered search result list. The numbered search result list may be displayed on or near the map. The data may be ordered based on distance from the center point of the selected region or may be ordered alphabetically. The data may include directional information, longitude/latitude coordinate information, contact information, and any relevant URL information. The user 210 may have the option to receive directions to any of the returned data items. Directions may be calculated from the center of the selected region or from another identified location. If the data is formatted in XML the client application 220 may need to parse the XML to extract the data elements.

Alternatively, data relevant to a segment in time of a sound data file may be retrieved. In this case there may be data objects linked to a time segment of a sound file. The user 210 may be presented with a visual representation of the sound file. The user may be able to select a region of the visual representation to receive data related to. The data the user receives may include a list of references that may be opened externally to the client application 220, such as a MICROSOFT WORD document, MICROSOFT EXCEL spreadsheet, photo or video amongst others. The list may be ordered based on proximity in time to the center point of the user selected region.

Decision nodes 450, 455, 460 and 465 may occur simultaneously or linearly. If the system 200 utilizes the ADOBE FLASH or any similar architecture, the architecture may include event handlers that listen for events to occur. If one of the events identified in blocks 450, 455, 460 and 465 occurs, the event handler may identify the event and take the steps identified in the flowchart. Alternatively, the system may perform all of the actions of blocks 470 and 475 immediately prior to submitting data to the application server 242.

During operation the user 210 may move the map and/or the selector tool. Moving the selector tool outside of the viewable area may cause the client application 220 to pan or re-center the viewable area to include the selector tool within the viewable area. At decision node 450, the system 200 may determine if the user 210 moved the map or the selector tool. Movement of the selector tool may require updating the data representation of the selected region. The map may be moved independent of the selected region, which also may require updating the data representation of the selected region. If the user 210 moved the map or the selector tool the system 200 moves to block 470, otherwise the logic of the system 200 moves to decision node 455. At block 470 the data representing the selected region may be updated. If the user 210 employed a circular selector tool moving the selector tool may cause the coordinates of the center point of the selector tool to change but may not affect the radius. Thus, the longitude and latitude of the center point of the selected region may be updated. The system 200 continues to block 425 where the data representation of the selected region and the category may be communicated to the application server 242.

During operation, the user 210 may resize the selector tool, to make the selected region bigger or smaller on the display. When the selector tool is resized, the scale of the map shown on the display may be resized or may stay the same. At decision node 455 the system 200 determines whether the user 210 resized the selector tool. If the user 210 employed a circular selector tool, resizing the selector tool may cause the radius of the selected region to change but it may not affect the coordinates of the selected region. If the user 210 resized the selector tool, the system moves to block 470; otherwise the system 200 moves to decision node 460. At block 470 the system 200 updates the data representation of the selected region. The data representation may include the location, the boundary and the size of the selector tool. If the user 210 employed a circular selector tool the system 200 may update the radius of the selected region. After updating the data representation of the selected region the system 200 proceeds to block 425. At block 425 the client application 220 may communicate the data representation of the selected region and the category to the application server 242.

During operation, the user 210 may zoom into or out of the map. At decision node 460 the system 200 may determine whether the user 210 used the zoom functionality of the map. By zooming into or out of the map the user 210 may change the data representation of the selected region. If the user 210 employed a circular selector tool, zooming into or out of the map may change the radius and the coordinates of the selected region. While the physical area of the selector tool may not change during a zoom, the region of the map encompassed by the selector tool may change. In the case of a circular selector tool, the radius of the region encompassed by the selector tool may change to match the scale of the underlying map and the longitude and latitude of the center point of the region may have changed.

If the user 210 zoomed into or out of the map, the system moves to block 470; otherwise the system 200 moves to decision node 465. At block 470 the system 200 updates the data representation of the selected region. If the user 210 employed a circular selector tool the system 200 may update the radius of the selected region and the longitude and latitude of the center point of the region. After updating the data representation of the selected region the system 200 proceeds to block 425. At block 425 the client application 220 may communicate the data representation of the selected region and the category to the application server 242.

Alternatively the data representing the selected region's boundaries may not change while the scale of the selected region may change to match the change in scale of the underlying map. In the case of a circular selector tool the longitude and latitude of the center point of the selected region may not change while the radius of the selected region may change to match the scale of the underlying map. This may require the client application 220 to re-center or pan the map if the selected region is no longer within the viewable area of the map as a result of the zoom.

Alternatively, both the data representing the selected region's boundaries and the scale of the selected region may remain fixed after a zoom. In the case of a circular selector tool both the longitude and latitude of the center point of the selected region and the radius of the selected region may remain fixed. This may require that the shape of the selector tool be resized to reflect the change in scale of the zoom.

A mapping application may also contain a mini-map tool in the corner of the display. A mini-map tool may allow a user 210 to quickly change the viewable area of the map. The tool may include a miniature map of the entire selectable area of the map and may allow the user 210 to move a selector over the region of the map they wish to view. The viewable area of the map may be the portion of the map shown on the display. The user selected region may be reflected on the miniature map of the mini-map tool.

During operation the user 210 may change the search criterion. At decision node 465, the system 200 may determine whether the user 210 changed the search criterion. If the user 210 did not change the search criterion, the system 200 may move to decision node 450. If the user 210 did change the search criterion, such as by selecting a new category, the system 200 may move to block 475. At block 475 the system 200 updates the search criterion variable to reflect the update and the steps continue to block 425. At block 425 the client application 220 may communicate the data representation of the selected region and the category to the application server 242.

Figure 5:
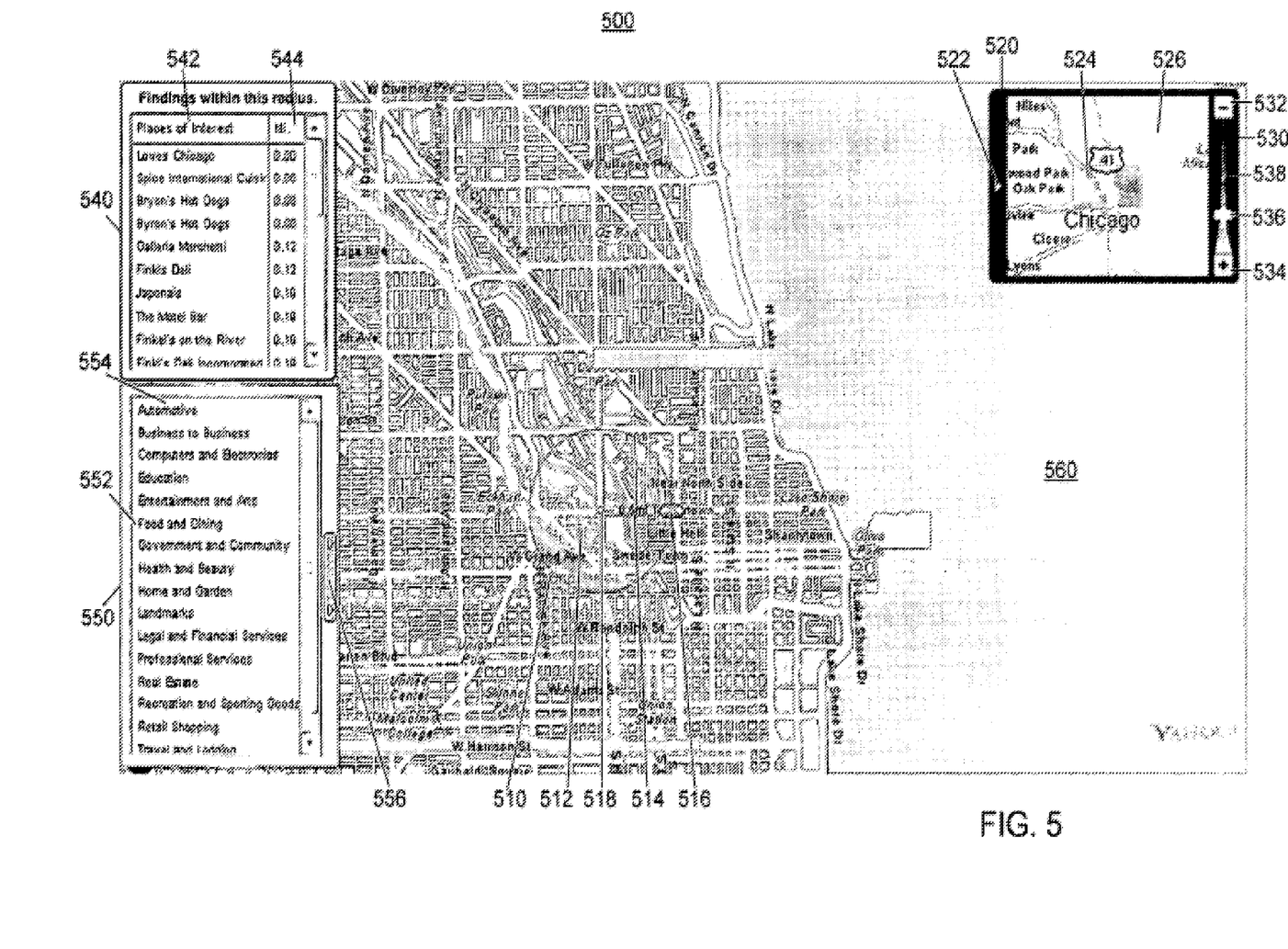
FIG. 5 is a screenshot of a mapping application implementing the selector tool.

FIG. 5 illustrates a screen shot of an exemplary user interface 500 of the tool. User interface 500 includes a selector tool 510, a mini-map tool 520, a zoom tool 530, a result window 540, a category selector tool 550 and a map 560. The selector tool 510 includes an area 512, a radius 514, a handle 516, and a center point 518. The mini-map tool 520 includes a mini-map activator button 522, a viewable map selector 524, and a mini-map 526. The zoom tool 530 includes a zoom out button 532, a zoom in button 534, a zoom level selector 536 and a zoom range 538. The results window 540 includes a results column 542 and a distance column 544. The category selector tool 550 includes a selected category 552, a list of categories 554, and a category selector activator button 556.

The user 210 may determine the selected region by moving the selector tool 510 to cover a portion of the map 560. The selector tool 510 may exist independent of the map 560. The visibility of the boundary of the selector tool 510 may demonstrate the persistency of the selector tool 510 upon selecting the region. The region of the map 560 covered by the area 512 of the selector tool 510 may be the region selected by the user 210. The selected region encompassed by the selector tool 510 may be described by the center point 518 and the radius 514 of the selector tool 510. In this case the longitude and latitude of the center point 518 of the selector tool 510 and the radius 514 of the selector tool 510 may be the data representing the selected region. Alternatively, the selected region may be described or represented in other ways, especially for selector tools of other shapes.

The user 210 may move the selector tool 510 by dragging any part of the selector tool 510. By dragging the handle 516 the user 210 may change the size of the area 512 and value of the radius 514, while the center point 518 of the selector tool 510 may remain constant. The user 210 may move the displayed map 560 by dragging any part of the map 560 that may not be covered by the selector tool 510, the mini-map tool 520 or the zoom tool 530. The selector tool 510 may not be fixed to the map 560, in which case moving the map 560 may change the region of the map 560 covered by the area 512 of the selector tool 510. Alternatively, the selector tool 510 may be fixed.

The user 210 may change the displayed map 560 by using the mini-map tool 520. If the mini-map tool 520 is not activated, the user 210 may click on the mini-map activator button 522 to access the mini-map tool 520. The mini-map 526 may display the entire selectable region of the map 560. A viewable map selector 524 may cover the area of the mini-map 526 that may currently be viewable on the map 560. The user 210 may drag the viewable map selector 524 to cover a different part of the mini-map 526. Moving the viewable map selector 524 may cause the map 560 to move to the geographic area of the mini-map 526 overlapped by the viewable map selector 524.

The user 210 may change the scale of the displayed map 560 by zooming into or out of the map 560 using the zoom tool 530. The user 210 may change the scale of the map 560 by clicking on the zoom in button 534 or the zoom out button 532 or by dragging the zoom level selector 536 up or down the zoom range 538. Alternatively, the user 210 may change the scale of the map 560 through direct shortcuts, such as using the scroll wheel of a mouse or pressing a keyboard key or key combination. The zoom level selector 536 may also indicate the current scale of the zoom. The selector tool 510 may remain unchanged by a zoom, but changing the scale of the map 560 may result in the selector tool 510 encompassing a different area of the map 560. Thus, a zoom may necessitate sending an update of the data describing the user selected region to the application server 242. In the case of the circular shaped selector tool 510, the value of the radius 514 of the selector tool 510 and the value of the coordinates of the center point 518 of the selector tool 510 may be sent to the application server 242. Selector tools of other shapes may be described by different data.

The user 210 may select the category they wish to receive specific information regarding by using the category selector tool 550. If the category selector tool 550 is not activated, the user 210 may click on the category selector activator button 556 to access the category selector tool 550. Examples of categories may include: automotive, business to business, computers and electronics, education, entertainment and arts, food and dining, government and community, health and beauty, home and garden, landmarks, legal and financial services, professional services, real estate, recreation and sporting goods, retail shopping, and travel and lodging or any other variable used to refine or filter the data displayed on the map. The user 210 may change the selected category 552 by clicking on any other category in the list of categories 554. If the category is changed, any search results in the selected region relating to the selected category 552 may be displayed.

The resizing, moving, zooming, and category selection actions described above may necessitate the system refresh the results window 540 with new data. Specifically these triggering events necessitating a refresh may occur when: the user 210 resizes the region 510 by dragging the handle 516, the user 210 moves the region 510 by dragging any part of the region 510 except the handle 516, the user 210 moves the map 560 by dragging any part of the map 560 except the areas covered by the selector tool 510, the mini-map tool 520, or the zoom tool 530, the user 210 zooms in or out of the map 560 by using the zoom tool 530, or the user 210 selects a different selected category 552 in the category selector tool 550.

When a triggering event occurs, the data representing the selected region and the selected category 552 may be transmitted to the application server 242. In the case of the circular shaped selector tool 510, this data may include the value of the radius 514, the longitude and latitude of the center point 518, and the selected category 552. The data may be transmitted as an XML message, as parameters in a URL query string, or in any similar data communication format. The application server 242 may then communicate with the data source 244 to obtain the results and transmit the results to the client application 220. The client application 220 may display the results in the results window 540, of the display, as a list including a results column 542 and a distance column 544. The results column 542 may display the name of the data item and the distance column 544 may display the distance from the data item to the center point 518 of the selected region 510.

Alternatively, when the user 210 zooms on the map 560, the center point 518 of the selector tool 510 may remain fixed to a location on the map 560. If the zoom causes the selector tool 510 to fall outside of the viewable area of the map 560, the application may have to re-center the map 560 on the center point 518 of the selector tool 510.

Alternatively, the data returned to the user 210 may be displayed within the selector tool 510. For instance, if the user 210 searches for transit data relevant to the selected area 512, the data displayed within the selected area 512 may change to transit lines that may run within the selected area 512. In this instance the view of the remainder of the map 560 may remain unchanged. Alternatively, the user 210 may be able to change the view of the selected area 512, to display a satellite view within the selected area 512, while the remainder of the map 560 remains unchanged.

Figure 6:
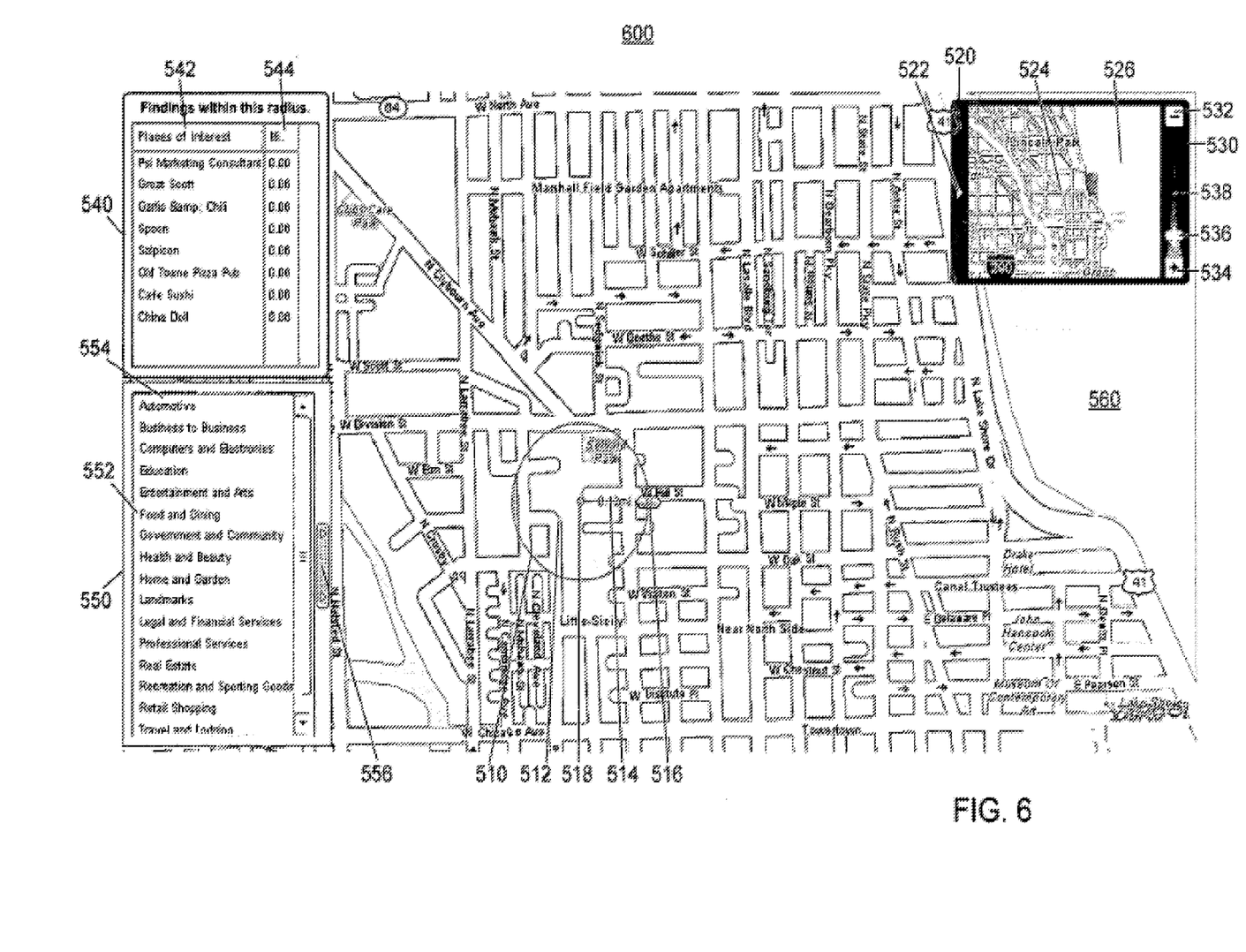
FIG. 6 is a screenshot of a mapping application implementing the selector tool regarding the affect of zooming on the selector tool.

FIG. 6 illustrates an exemplary screen shot 600, which may be displayed by the system 200 when the user 210 uses the zoom tool 530 to change the scale of the map 560 in FIG. 5. The map 560 in FIG. 6 is the viewable map that may result from the user 210 using the zoom tool 530 on the map 560 in FIG. 5. The selector tool 510 in FIG. 6 may remain the same size as the selector tool 510 in FIG. 5. However, the value of the radius 514 of the selector tool 510 in FIG. 6 may be different than the value of the radius 514 of the selector tool 510 in FIG. 5. In FIG. 6, the change in size of the radius 514 of the selector tool 510 reflects the area 512 of the selector tool 510 mirroring the change in scale of the map 560 as a result of the zoom. The visibility of the boundary of the selector tool 510, may demonstrate the persistency of the selector tool 510 after a zoom.

In FIG. 6, the center point 518 of the selector tool 510 may not be covering the same point on the map 560 as the center point 518 of the selector tool 510 on the map 560 in FIG. 5. Both the selector tool 510 and the map 560 may move independent of each other and therefore the map 560 may move independently of the selector tool 510 during a zoom. Alternatively, the center point 518 of the selector tool 510 may remain fixed on a point on the map 560 during a zoom. This may require the client application 220 to re-center the viewable area of the map 560 after a zoom if the zoom results in the selector tool 510 being outside of the viewable area of the map 560.

Figure 7:
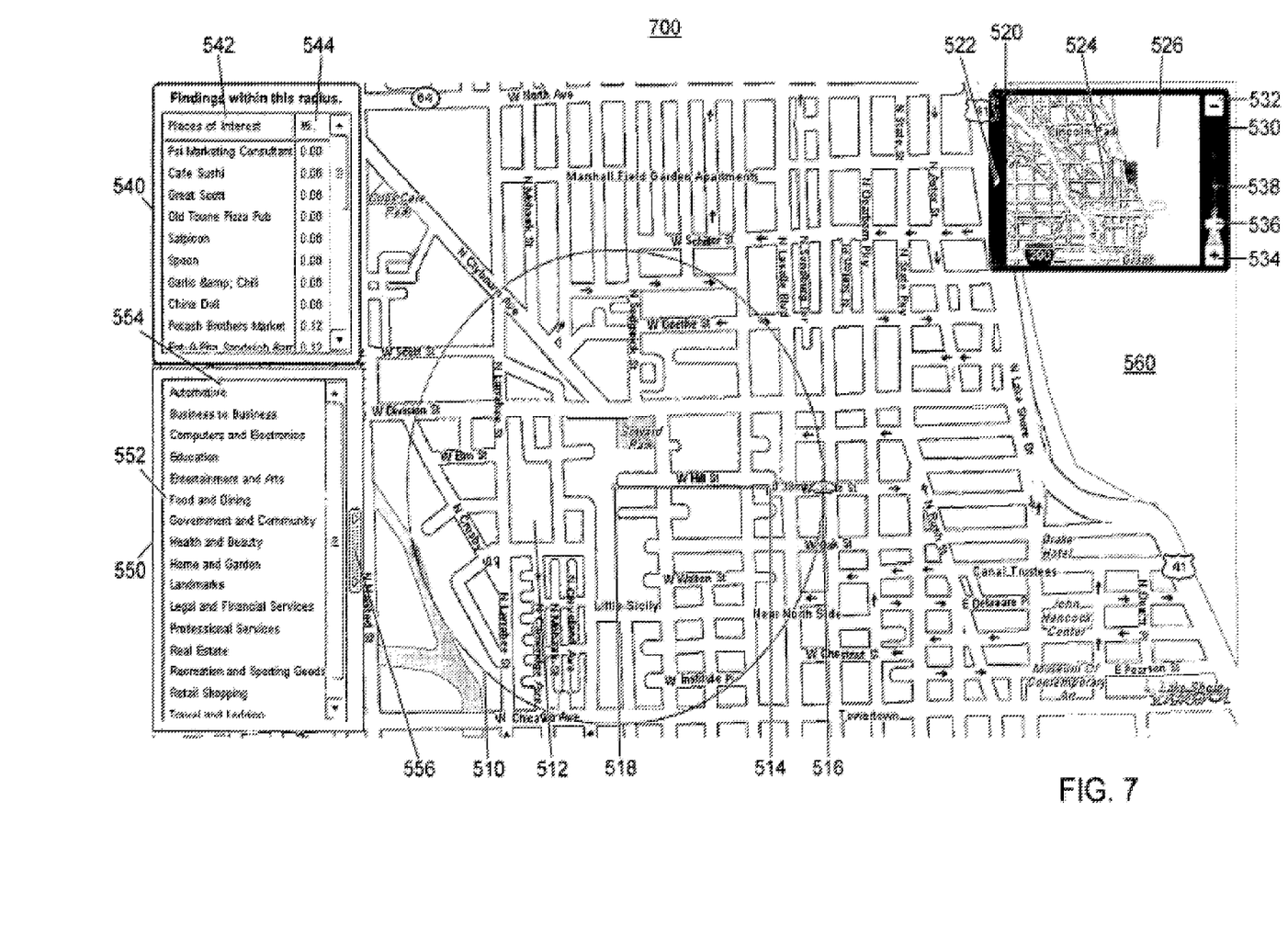
FIG. 7 is a screenshot of a mapping application implementing the selector tool regarding the affect of resizing the selector tool.

FIG. 7 illustrates an exemplary screen shot of the invention, 700, when the user 210 uses the handle 516, of the selector tool 510 in FIG. 6, to resize the area 512 of the selector tool 510. The resized area 512 of the selector tool 510 in FIG. 7 may be the result of the user 210 using the handle 516, of the selector tool 510 in FIG. 6, to resize the area 512 of the selector tool 510. In FIG. 7, the value of the radius 514 of the selector tool 510 may differ from the value of the radius in FIG. 6. This difference may reflect the change in size of the area 512 of the selector tool 510 in FIG. 7. The visibility of the boundary of the selector tool 510 may demonstrate the persistency of the selector tool 510 after the user 210 moves the selector tool 510.

The user 210 may be able to resize the area 512 of the selector tool 510 by dragging the handle 516 of the selector tool 510 towards or away from the center point 518 of the selector tool 510. The handle 516 may be located on the boundary of the selector tool 510. Alternatively the handle 516 may be located elsewhere on the selector tool 510 or the selector tool 510 may be resized by using the scroll-wheel of a mouse or a similar input device. The value of the radius 514 of the selector tool 510 may change as the user 210 resizes the area 512 of the selector tool 510.

Figure 8:
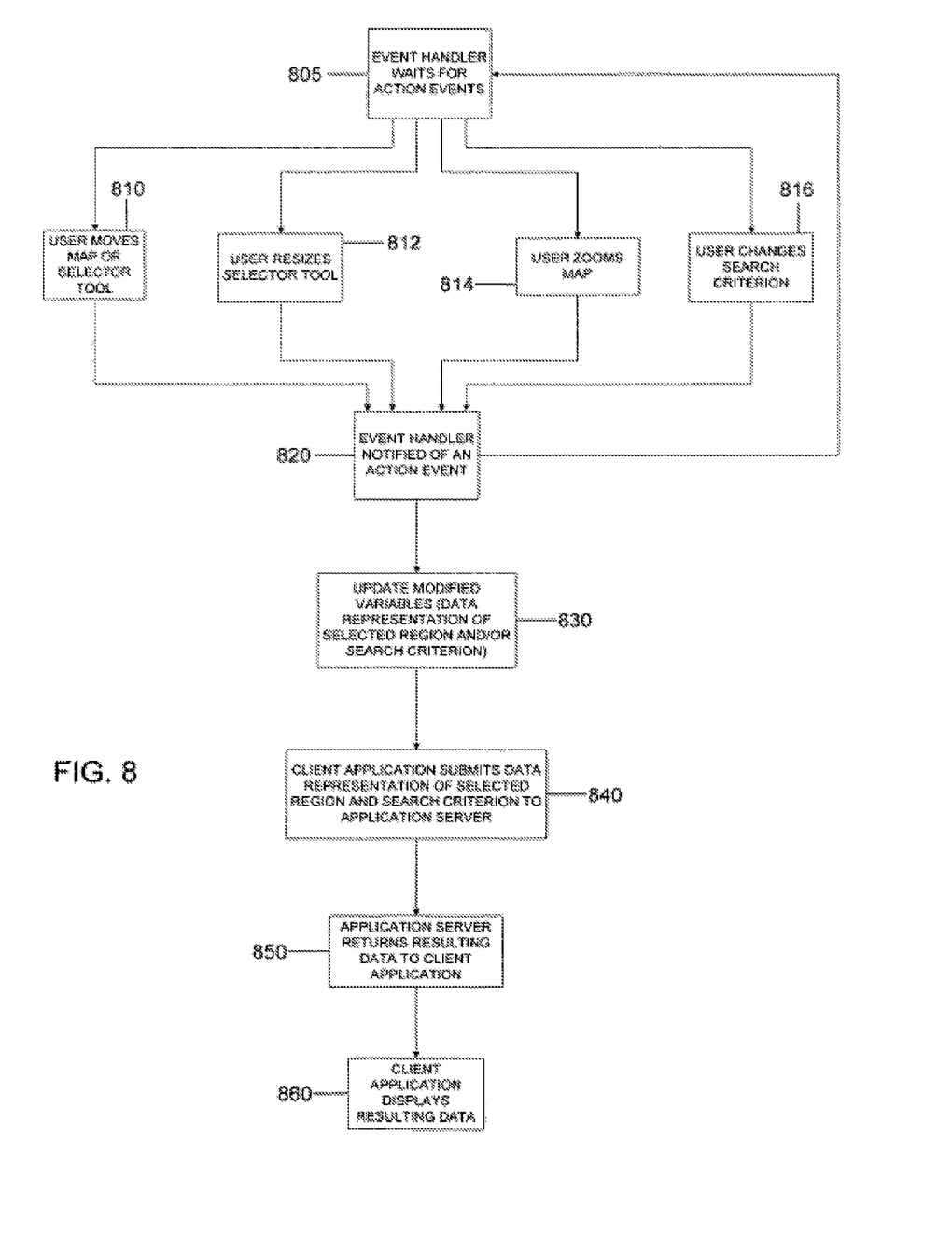
FIG. 8 is a flowchart illustrating dynamic operations of a system implementing the selector tool.

FIG. 8 illustrates an exemplary logic for the dynamic retrieval of data from a server, such as application server 242. At block 805 the event handler waits for an action event to occur. Action events may include any interaction between the user 210 and the client application 220, including but not limited to: the user 210 moving the map 560 or selector tool 510, the user 210 resizing the selector tool 510, the user 210 zooming the map 560, and the user 210 changing the selected category 552. There may also be action events that are unrelated to the user's 210 interaction with the client application 220. The event handler may operate in parallel with the rest of the client application 220; that is the event handler may listen for action events while the rest of the client application 220 functions independently.

At blocks 810, 812, 814 and 816, the user 210 interacts with the client application 220 in a manner that may have a direct effect on the results being displayed to the user 210. At block 810 the user 210 moves the map 560 or the selector tool 510, at block 812 the user 210 resizes the selector tool 510, at block 814 the user 210 zooms in on the map 560, and at block 816 the user 210 changes the search criterion, such as the selected category 552. Data retrieval may be dynamic since the occurrence of any of these events may automatically notify the event handler that an action event may have occurred at block 820. This occurs without the need for the user 210 to perform another action or without further input from the user 210, such as without the need to click a search button or any other interaction.

At block 830, the variables that were affected by the action event may be updated. At block 840 the client application 220 may automatically submit the updated data representation of the selected region and search criterion to the application server 242. At block 850 the application server 242 may return the resulting data to the client application 220, and at block 860 the client application 220 may display the resulting data to the user 210. The event handler may constantly continue to listen for new action events.

The illustrations of the embodiments described herein are intended to provide a general understanding of the structure of the various embodiments. The illustrations are not intended to serve as a complete description of all of the elements and features of apparatus and processors that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

We claim:

1. A system for retrieving data within a selected region of a layer, the system comprising:
   an application server comprising at least one processor and at least one memory, the application server configured to:
      receive data from a user device representing a user selected region of a selector tool corresponding to a layer and a search criterion, wherein the user selected region of the selector tool has a first scale and the layer has a second scale;
      query a database in operative communication with the application server for at least one location within the layer related to the search criterion and the user selected region of the selector tool, the query including the data representing the user selected region and the search criterion;
      receive, from the database, at least one data result corresponding to the at least one location within the user selected region and related to the search criterion;
      provide the at least one data result to the user device;
      receive updated data from the user device representing a user-initiated change of the second scale of the layer;
      automatically change the first scale of the user selected region of the selector tool proportionally to the change of the second scale of the layer to define an updated region of the selector tool;
      query the database for at least one updated location within the layer related to the search criterion and the updated region of the selector tool;
      receive, from the database, the at least one updated data result corresponding to the at least one updated location; and
      provide the at least one updated data result to the user device.

2. The system of claim 1 wherein the user-initiated change of the second scale of the layer further comprises a user-initiated zoom of the layer.

3. The system of claim 1 wherein the application server is further configured to:
   effect display of the layer on the user device in the second scale;
   effect display of a boundary of the user selected region on the user device in the first scale; and
   enable a user to change the second scale of the layer to an updated second scale;
   effect display of the layer in the updated second scale; and
   effect a persistent display of the boundary of the user selected region on the user device in response to effecting display of the layer in the updated second scale.

4. The system of claim 1 wherein the user selected region further includes a center point associated with a first point on the layer and wherein the application server is further configured to:
   receive updated data from the user device representing a user-initiated movement of the layer; and automatically change the center point of the user selected region to be associated with an updated point on the layer in accordance with the user-initiated movement of the layer to define the updated region of the layer.

5. The system of claim 1 wherein the application server is further configured to:
query a data source for advertising data related to the user selected region, the updated region, and the search criterion; and
provide the advertising data to the user device.

6. The system of claim 1 wherein the application server is further configured to:
receive, from the database, at least a second data result corresponding to at least one location outside of the user selected region and relating to the search criterion; and
provide the second data result to the user device such that the second data result is distinguished from the at least one data result corresponding to the at least one location within the user selected region.

7. The system of claim 1 wherein the user selected region comprises a polygonal region.

8. The system of claim 1 wherein the user selected region includes a user selected path on the layer and a user selected range from the user selected path.

9. The system of claim 1 wherein the layer comprises a map.

10. A method for providing locations within a selected region of a layer, the method comprising:
at an application server:
receiving data from a user device representing a user selected region of a selector tool corresponding to a layer and a search criterion, wherein the user selected region of the selector tool has a first scale and the layer has a second scale;
querying a database in operative communication with the application server for at least one location within the layer related to the search criterion and the user selected region of the selector tool, the query including the data representing the selected region and the search criterion;
receiving, from the database, at least one data result corresponding to the at least one location within the user selected region and related to the search criterion;
providing the at least one data result to the user device;
receiving updated data from the user device representing a user-initiated change of the second scale of the layer;
automatically changing the first scale of the user selected region of the selector tool proportionally to the change of the second scale of the layer to define an updated region of the selector tool;
querying the database for at least one updated location within the layer related to the search criterion and the updated region of the selector tool;
receiving, from the database, the at least one updated data result corresponding to the at least one updated location; and
providing the at least one updated data result to the user device.

11. The method of claim 10 wherein receiving the updated data from the user device representing a user-initiated change of the second scale of the layer further comprises receiving a user-initiated zoom of the layer.

12. The method of claim 10 further comprising:
effecting display of the layer on the user device in the second scale;
effecting display of a boundary of the user selected region on the user device in the first scale; and
enabling a user to change the second scale of the layer to an updated second scale;
effecting display of the layer in the updated second scale; and
effecting a persistent display of the boundary of the user selected region on the user device in response to effecting display of the layer in the updated second scale.

13. The method of claim 10 wherein receiving the data representing the user selected region of the layer further comprises receiving a center point associated with a first point on the layer, and wherein method further comprises:
receiving updated data from the user device representing a user-initiated movement of the layer; and
automatically changing the center point of the user selected region to be associated with an updated point on the layer in accordance with the user-initiated movement of the layer to define the updated region of the layer.

14. The method of claim 10 further comprising:
querying a data source for advertising data related to the user selected region, the updated region, and the search criterion; and
providing the advertising data to the user device.

15. The method of claim 10 further comprising:
receiving, from the database, at least a second data result corresponding to at least one location outside of the user selected region and relating to the search criterion; and
providing the second data result to the user device such that the second data result is distinguished from the at least one data result corresponding to the at least one location within the user selected region.

16. The method of claim 10 wherein receiving the data representing the user selected region of the layer further comprises receiving data representing a polygonal region.

17. The method of claim 10 wherein receiving the data representing the user selected region of the layer further comprises receiving data representing a user selected path on the layer and a user selected range from the user selected path.

18. The method of claim 10 wherein the layer comprises a map.

19. A user device comprising a processor and a display, the user device in communication with an application server, the user device configured to:
display a map on the display, the map having a first scale;
display a region boundary defining a selected region of a selector tool corresponding to the map, the selected region having a second scale;
receive, from a user, a search criterion;
transmit to the application server data representing the selected region defined by the selector tool and the search criterion to effect a query for a result location within the selected region defined by the selector tool related to the search criterion;
receive from the application server a query result comprising the result location within the selected region defined by the selector tool related to the search criterion;
display the result location on the map via the display;
receive, from the user, an instruction to change the scale of the map to an updated first scale;
display the map on the display in the updated first scale;

displaying the region boundary on the display in an unchanged manner such that the region boundary defines an updated region corresponding to the map in proportion to the change of the scale of the map in response to displaying the map in the updated first scale;

transmit to the application server updated data representing the updated region defined by the selector tool to effect an updated query for an updated result location within the updated region defined by the selector tool related to the search criterion;

receive from the application server an updated query result comprising the updated result location within the updated region defined by the selector tool related to the search criterion; and display the updated result location on the map via the display.

20. The user device of claim 19 further configured to:

receive, from the user, a user selection of a polygonal area comprising the selected region of the selector tool corresponding to the map.

* * * * *